(12) United States Patent
Eriksson et al.

(10) Patent No.: US 7,300,384 B2
(45) Date of Patent: Nov. 27, 2007

(54) METHODS AND DEVICES FOR CONTROLLING A DISK CLUTCH

(75) Inventors: Anders Eriksson, Göteborg (SE); Svante Karlsson, Västra Frölunda (SE); Erik Lauri, Mölndal (SE); Marcus Steen, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 51 days.

(21) Appl. No.: 10/905,465

(22) Filed: Jan. 5, 2005

(65) Prior Publication Data

US 2005/0170933 A1 Aug. 4, 2005

Related U.S. Application Data

(63) Continuation of application No. PCT/SE03/00929, filed on Jun. 5, 2003, now abandoned.

(30) Foreign Application Priority Data

Jul. 5, 2002 (SE) .................................. 0202137

(51) Int. Cl.
*B60W 10/02* (2006.01)
(52) U.S. Cl. .......................................... 477/180; 477/79
(58) Field of Classification Search ............ 477/174–6, 477/180, 900, 901, 79, 80; 192/3.52, 3.54, 192/3.55, 3.61, 3.63; 701/67, 68, 53
See application file for complete search history.

(56) References Cited

U.S. PATENT DOCUMENTS 5,681,242 A * 10/1997 Bates ........................ 477/180
6,001,044 A * 12/1999 Amendt ....................... 477/180
6,616,577 B2 * 9/2003 Hayashi ....................... 477/168
6,711,486 B1 3/2004 Karlsson et al.
6,767,311 B2 * 7/2004 Yoshikawa et al. ......... 477/176

FOREIGN PATENT DOCUMENTS

| DE | 19822547 C1 | 12/1999 | | |
|---|---|---|---|---|
| DE | 19937972 A1 | 2/2001 | | |
| JP | 402159419 A | * 6/1990 | ................. | 477/901 |
| WO | WO 0117815 A1 | 3/2001 | | |

OTHER PUBLICATIONS

English translation of DE 19822547C1 (from IDS). Translation provided by the EPO.*

* cited by examiner

*Primary Examiner*—Roger Pang
(74) *Attorney, Agent, or Firm*—Novak Druce & Quigg, LLP

(57) ABSTRACT

Method and device for controlling the position of an automatic disk clutch (3) as a function of the position of a throttle lever (48, 49) arranged in a vehicle is disclosed. In some preferred embodiments, the method is employed when starting the vehicle from stationary or virtually from stationary, in which a function (e.g., a primary function) of the disk clutch (3) is to transmit motive force from an internal combustion engine (1) arranged in a vehicle to an input shaft (7) of a stagegeared gearbox (9). The position (48, 49) of the disk clutch is also preferably controlled as a function of at least one of the parameters: vehicle weight; tractive resistance of the vehicle; and the selected transmission ratio between the gearbox input shaft and the driving wheels of the vehicle.

13 Claims, 3 Drawing Sheets (Prior art)

METHODS AND DEVICES FOR CONTROLLING A DISK CLUTCH

CROSS-REFERENCE TO RELATED APPLICATIONS

The present application is a continuation patent application of International Application No. PCT/SE03/00929 filed 5 Jun. 2003 which was published in English pursuant to Article 21 (2) of the Patent Cooperation Treaty, and which claims priority to Swedish Application No. 0202137-6 filed 5 Jul. 2002. Said applications are expressly incorporated herein by reference in their entireties.

FIELD OF THE INVENTION

The preferred embodiments of the present invention relate to methods and devices for controlling an automatic disk clutch, the disk clutch being arranged in a motor vehicle in order to transmit motive force from an internal combustion engine to a gearbox.

DESCRIPTION OF THE RELATED ART

Automatic gearboxes of the automatic stage-geared gearbox type have become ever more common in heavier vehicles with the increasing development of microprocessor systems, making it possible, with a control computer and a number of control devices, such as servomotors, for example, to precisely regulate the engine speed, engagement and disengagement of an automatic disk clutch between engine and gearbox, and gearbox clutch members in relation to one another, so that smooth gear changes are always achieved at the correct engine speed. The advantage with this type of automatic gearbox as compared to a conventional automatic gearbox, made up of planetary gear trains and having a hydrodynamic torque converter on the inlet side, lies partly in the fact that it is simpler and more robust and can be manufactured at a substantially lower cost than the conventional automatic gearbox, especially when used in heavy vehicles, and partly in that it affords a greater efficiency, which means scope for or provision of reduced fuel consumption.

A stage-geared gearbox usually comprises (includes, but is not necessarily limited to) an input shaft, an intermediate shaft, which has at least one toothed gear meshing with a toothed gear on the input shaft, and main shaft with toothed gears, which mesh with toothed gears on the intermediate shaft. The main shaft is then further connected to an output shaft coupled to the driving wheels via a prop shaft, for example. Each pair of toothed gears has a different gear ratio from another pair of gears in the gearbox. Different transmission ratios are obtained in that different pairs of gears transmit the torque from the engine to the driving wheels.

The development of computer technology has also had an impact on electronic control and feedback systems for a vehicle engine, and these systems have become more precise, faster and more adaptable to prevailing engine and environmental conditions. The entire combustion process can be precisely controlled according to any operating situation. The vehicle's throttle lever (an accelerator pedal, for example), which primarily controls the fuel supply to the engine, controls the vehicle's engine via electrical wiring and electronic signals. The throttle lever is therefore equipped with sensors for detecting the throttle lever position, that is to say what amount of throttle opening is required.

In the process of starting or maneuvering the vehicle, an automatic disk clutch as described above is usually controlled by means of information on the position of the throttle lever, the rotational speed of the engine, the engine output torque, the position of the disk clutch and from a reference position of the disk clutch, which is selected on the basis of when the disk clutch just begins to transmit torque (traction position), which position is relatively easy to define. A torque typically transmitted in the reference position may be in the order of about 30 Nm. The engine output torque is mostly calculated from the quantity of fuel injected into the engine. In the starting sequence and maneuvering, the vehicle is typically started from stationary or a virtually stationary state, and the engine commences the sequence at an idling speed. The position of the disk clutch and hence the degree of engagement, which determines the torque transmitted from the engine to the gearbox, primarily depends on where the driver positions the throttle lever. The reference position of the disk clutch is used to give the driver of the vehicle more accurate control of the vehicle starting in that the disk clutch assumes the reference position immediately where a starting gear is selected. Thus, in many situations the driver experiences only a small flat spot, if any, when the accelerator pedal is depressed. The driver, therefore, obtains a theoretically direct response and the vehicle in principle starts to move as soon as the accelerator pedal starts to be depressed.

FIG. 1a shows the fundamental correlation between the position of the accelerator pedal and the torque transmitted to the input shaft of the gearbox according to the related art. When the accelerator pedal is fully released and a starting gear is selected, the disk clutch assumes the reference position and a certain torque is therefore transmitted to the input shaft of the gearbox. The more the driver depresses the accelerator pedal, the more torque is transmitted to the gearbox and an acceleration of the vehicle is obtained. FIG. 1b correspondingly shows basically how, according to the related art, the position of the disk clutch depends on the position of the accelerator pedal. With the accelerator pedal released, the reference position (RF) is assumed, and from the reference position the disengagement diminishes the more the accelerator pedal is depressed, which gives the increasing torque transmission according to FIG. 1a. The maximum position in FIG. 1b denotes the clutch in the fully engaged position.

The reference position and the predefined correlation between the accelerator pedal position and the disk clutch position functions well in most driving situations. The torque transmission to the gearbox input shaft for a certain clutch position is, however, affected by wear, changes in the coefficient of friction of the disks and variations in the thickness of the disks due to temperature fluctuations, so that the torque transmitted for a certain clutch position may differ somewhat from one starting sequence to another. This can effect the reference position and the flat spot may increase, which leads to an inferior throttle accuracy in the starting sequence. In other and in most situations even more decisive factors are variations in the total weight of the vehicle equipment and the tractive resistance of the vehicle, in which the road gradient, the rolling resistance and the aerodynamic resistance all play a part. Where the actual traction position of a disk clutch ultimately ends up, therefore depends upon several factors and may in certain cases vary greatly between two different starting sequences. The driver in certain situations therefore experiences an unsatisfactory throttle accuracy in the handing of the vehicle during the starting sequence due to variations in clutch wear, the coefficient of friction of the disks, the thickness of the disks, the vehicle weight and the tractive resistance of the vehicle.

There is, therefore, a need, in a vehicle equipped with an automatic disk clutch, to control the work of the clutch more accurately in order to achieve greater throttle accuracy of the vehicle in the starting sequence and in maneuvering. This is one notable object of some preferred embodiments of the invention.

SUMMARY OF THE INVENTION

Some exemplary manners for achieving, e.g., the above notable object with respect to the method and the device according to some preferred embodiments of the invention are described in the independent claims below. The dependent claims describe other preferred embodiments of methods according to some embodiments of the invention and devices according to some embodiments invention.

According to some embodiments of the invention, a method is provided for controlling the position of an automatic disk clutch as a function of the position of a throttle lever arranged in the vehicle, the method being used in starting the vehicle from a stationary or a substantially or virtually stationary state, and in which method the main function of the disk clutch is to transmit motive force from an internal combustion engine arranged in the vehicle to an input shaft to a stage-geared gearbox arranged in the vehicle. The preferred embodiments of the invention include that the position of the disk clutch is also controlled as a function of at least one of the following parameters: vehicle weight, tractive resistance of the vehicle and the selected transmission ratio between the gearbox input shaft and the driving wheels of the vehicle.

According to some preferred embodiments of the invention, a device is provided for controlling the position of a disk clutch, a notable (such as, e.g., a primary function) of which disk clutch is to transmit motive force from an internal combustion engine arranged in a vehicle to the input shaft of a stage-geared gearbox arranged in the vehicle, the device comprising a throttle lever position sensor for a throttle lever arranged in the vehicle, means to determine the tractive resistance of the vehicle, means to determine the vehicle weight and means to determine the selected transmission ratio between the gearbox input shaft and the driving wheels of the vehicle, all of which means and position sensors are coupled to a control unit and in which the control unit is designed to control the position of the disk clutch as a function of a signal from the throttle lever position sensor. In some embodiments, the device includes that the control unit is designed, when starting the vehicle from stationary or virtually from stationary, to control the position of the disk clutch also as a function of the signal from at least one of the said means to determine the tractive resistance of the vehicle, means to determine the vehicle weight and means to determine the selected transmission ratio between the gearbox input shaft and the driving wheels of the vehicle.

An advantage of the method and the device according to the preferred embodiments of the invention is that they afford the driver better control of the vehicle in the starting sequence, such control being unaffected by varying vehicle weight, transmission ratio or tractive resistance, since the preferred embodiments take into account these parameters.

According to an advantageous second embodiment of the method and the device according to the invention, a torque characteristic with the torque values and associated disk clutch position assumed is stored in the control unit. When a clutch position matching a required transmitted torque is attained, the transmitted torque is measured and the control unit registers any new transmitted torque to the relevant clutch position. A "slow" adjustment of the torque characteristic is achieved.

An advantage of this is that even parameters slowly varying over time, such as changes in the coefficient of friction of the disks due to wear are allowed for in the adjustment of the disk clutch position.

According to an advantageous third embodiment of the method and the device according to the invention, the position of the disk clutch is directly controlled through measurement of the transmitted torque.

An advantage of this is that all parameters, that is to say variations in the clutch wear, the coefficient of friction of the disks, disk thickness, vehicle weight and the tractive resistance of the vehicle, for example, are taken into account. The driver will therefore at all times experience the same response for a certain throttle lever position regardless of variations in parameters. Any flat spot on the throttle lever when controlling the starting sequence is eliminated.

Further advantageous embodiments of the invention are set forth in the succeeding dependent claims.

BRIEF DESCRIPTION OF THE DRAWINGS

The present invention will be described in more detail below with reference to the accompanying drawings attached, and which by way of example show preferred embodiments of the invention and the related art.

DESCRIPTION OF THE PREFERRED EMBODIMENTS

Figure 1A:
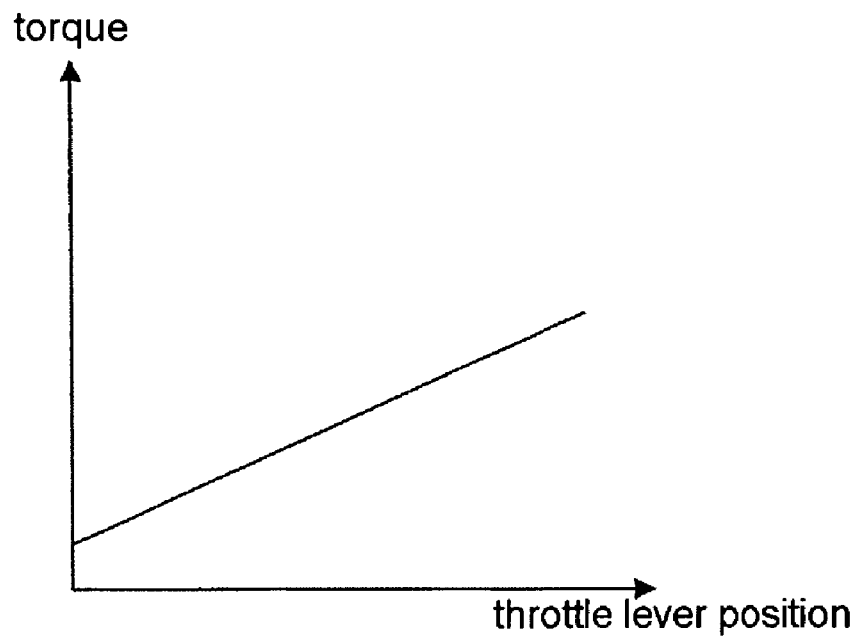
FIG. 1a and 1b show the fundamental correlation between the transmitted torque and the throttle lever position, and between the clutch position and the accelerator pedal position according to the related art.
Figure 1B:
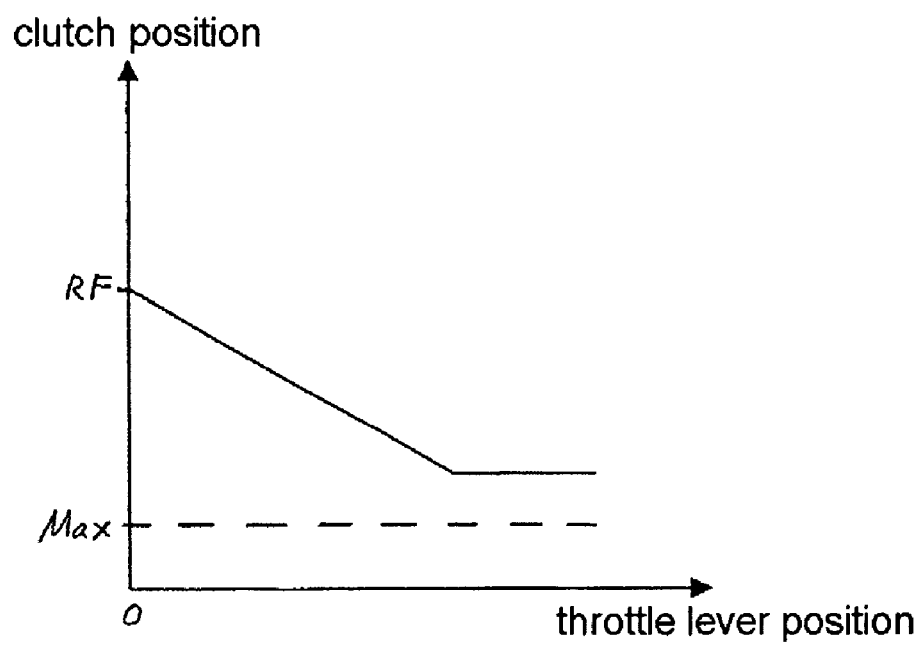
Figure 2:
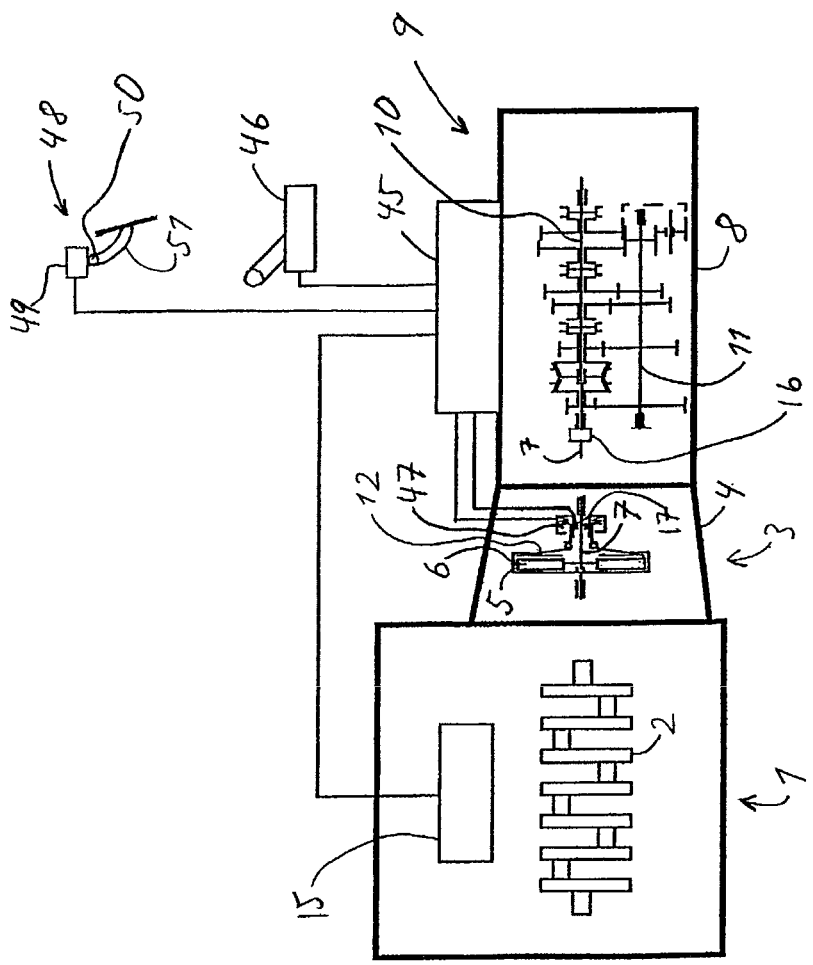
FIG. 2 shows a schematic diagram of an embodiment of a device for controlling an automatic disk clutch according to some embodiments of the invention, the disk clutch being arranged between an engine and an automatic stage-geared gearbox.

In FIG. 2, reference numeral 1 denotes a six-cylinder internal combustion engine, for example a Diesel engine, the crankshaft 2 of which is coupled to a single-disk dry clutch generally denoted by 3, which is enclosed in a clutch cover 4. Depending on the magnitude of the maximum torque to be transmitted by the clutch, the clutch may have more than one disk and pressure plate 12. The crankshaft 2 is rotationally fixed to the clutch housing 5 of the clutch 3, while the disk 6 thereof is rotationally fixed to an input shaft 7, which is rotatably supported in a gearbox housing 8 of a gearbox generally denoted by 9. A main shaft 10 and an intermediate shaft 11 are also rotatably supported in the housing 8.

Servo devices (not shown) in the gearbox, which engage and disengage the different gears in the gearbox 9, are controlled by an electronic control unit 45 as a function of control unit input signals representing various engine and vehicle data. Among other things, the control unit 45 includes a microcomputer with memory units. In the embodiment shown, the throttle lever 48 is an accelerator pedal, but it may also feasibly be some form of manually controlled throttle, for example a throttle on the steering wheel. The position of the throttle lever is obtained from an angle sensor 49, which is coordinated with the pedal arm 51 of the throttle lever 48 pivotally mounted on a shaft 50. When the gear selector 46 is in the manual shift position, gear shifting is performed at the driver's command via the gear selector 46. The control unit 45, via an engine control unit 15, may also control the fuel injection, that is to say the engine torque or the engine speed, as a function of the throttle lever position and the air admission to a pneumatic piston-cylinder device 47, which controls the clutch 3. The position of the automatic clutch 3 is obtained by a position sensor 17.

The degree of engagement of the disk clutch 3 may be divided into several different levels or positions. The traction position is the position of the clutch 3 when it is transmitting just sufficient motive force from the engine 1 to the gearbox 9 that the vehicle can just start to move forwards from stationary. An illustrative known method of identifying the traction position is shown, for example, in Swedish Patent Document No. 9903117-1 and in corresponding U.S. Pat. No. 6,711,486 entitled Drive Unit for a Motor Vehicle and Method of Identifying the Engagement Position of an Automatic Clutch Being Part of the Drive Unit. A typical value for the traction position is a clutch position which transmits approximately 30 Nm.

At the initiation of a starting sequence, for example the selection of a starting gear either by a driver or by an automatic control system, the control unit 45 according to one embodiment of the invention, determines a set-point value for the position of the disk clutch 3 on the basis of prevailing conditions.

The control unit 45 picks up signals relating to the parameters: throttle lever position; vehicle weight; tractive resistance and selected transmission ratio between the input shaft 7 of the gearbox 9 and the drive wheels, in order to ascertain the prevailing conditions for the starting sequence. These parameters can be collated or obtained in any of a variety of manners known in the art.

Figure 3A:
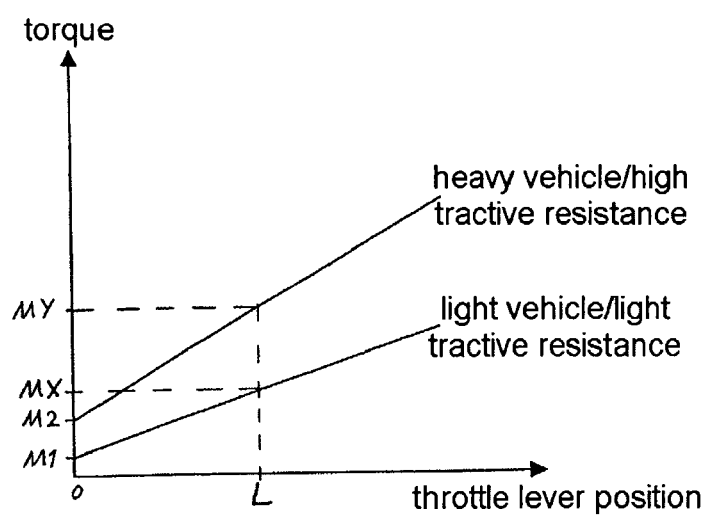
FIG. 3a and 3b show the fundamental correlation between transmitted torque and throttle lever position, and between clutch position and accelerator pedal position according to some embodiments of the invention.
Figure 3B:
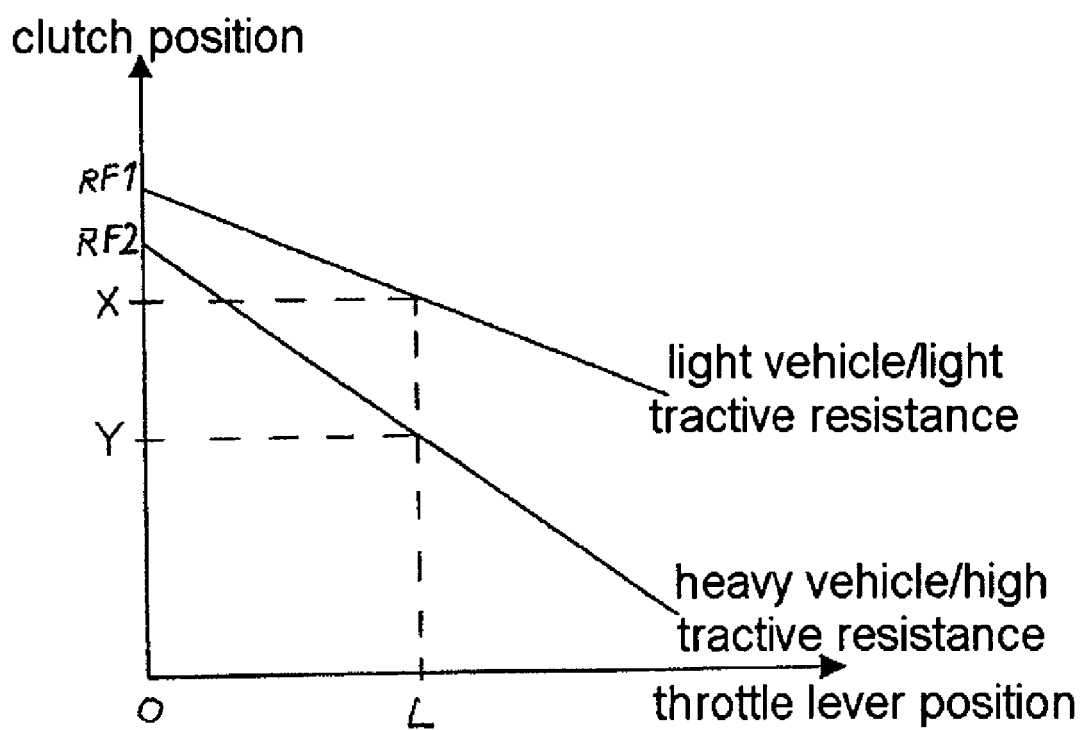

The set-point value for the clutch position is determined so that for a given throttle lever position the clutch 3 assumes a more engaged position given a higher vehicle weight and/or a greater tractive resistance and/or a higher starting gear (lower transmission ratio), and correspondingly a less engaged position given a lower vehicle weight and/or a lower tractive resistance and/or a lower gear. FIG. 3*b* shows a principle of how the control unit 45 can select a set-point value from the said input parameters. If the position of the throttle lever 48 is L, the vehicle is light, a low starting gear is selected and the tractive resistance is low, so the less engaged position X is selected as set-point value of the clutch position. If, at the same throttle opening L, on the other hand, the vehicle is heavy, a high starting gear is selected and the tractive resistance is high, the position Y is selected as the set-point value for the clutch 3. Consequently, this involves a more engaged position which transmits more torque to the input shaft 7 of the gearbox 9. The vehicle weight, the tractive resistance and the starting gear selected very often vary from one starting sequence to another, which for a given accelerator pedal position, for example L, means that the set-point value for the clutch position can, according to the example shown, vary between the position X and Y. The maximum permitted value and the minimum permitted value for the set-point value of the clutch 3 for a certain accelerator pedal position are determined from the capacity of the disk clutch 3, the engine 1 and the transmission (gearbox 3, prop shaft, rear axle with constituent components). At a zero throttle opening, that is to say with the accelerator pedal 48 fully released, the control system 45 selects a set-point value for the clutch position in the range RF1 to RF2 (see FIG. 3*b*). The control system 45 may also select a more disengaged position at zero throttle opening, if the control system does not receive signals indicating that the driver intends to start the vehicle, for example if the control system detects that the driver is keeping the vehicle brake pedal depressed.

The preferred embodiments of the invention give the driver a traction position suited to a certain starting sequence, which eliminates any flat spot on the accelerator pedal 48 by adjusting the starting sequence, that is to say a flat spot between the driver starting to depress the accelerator pedal 48 to an accelerator pedal position in which the torque transmitted is just sufficiently large for the vehicle to start moving. By means of the preferred embodiments of the invention, the traction position is attained promptly (e.g., immediately) on starting to depress the accelerator pedal 48.

The transmission control system 45 adjusts the position of the clutch 3 to the position determined by the set-point value function using the position sensor 17. The set-point value is continuously calculated during a starting sequence and can afterward to be modified during a starting sequence, for example depending on whether the driver varies the throttle opening during the starting sequence.

In the preferred embodiments of the invention, the torque transmitted to the input shaft 7 of the gearbox 9 may vary somewhat for two different but comparable starting sequences with the same vehicle weight, tractive resistance, transmission ratio and accelerator pedal position. This is because of possible changes in the coefficient of friction of the disks 6, changes in the disk thickness due to temperature fluctuations and any other factors that are difficult to predict. Advantages compared to the related art should be appreciated, however, since the control system determines the set-point value from the parameters that have the greatest effect on the ultimate traction position of the clutch 3, that is to say, the vehicle weight, the tractive resistance and the transmission ratio.

According to a second advantageous embodiment of the invention, a torque sensor 16 is arranged on the gearbox input shaft 7 (see FIG. 2). The torque sensor 16 may be of the type in which the shaft 7 is magnetized with a special magnetic pattern. The magnetic pattern is deformed when the shaft 7 is twisted (due to an applied torque). The measuring circuit of the torque sensor 16 includes one or more coils which are located around the shaft 7 where the magnetic pattern is situated. The measuring circuit registers the changes in the magnetic pattern and delivers an electrical signal which corresponds to the torque applied. This torque sensor is of the proximity type and is known in the art. Stored in the control system 45 for this embodiment of the invention is a table (torque characteristic of the disk clutch 3) in which a certain clutch position is assumed to correspond to a predetermined value for the torque transmitted to the gearbox input shaft 7. By means of the said table, the control unit 45 determines a set-point value for the transmitted torque and corresponding clutch position from the given parameters. FIG. 3*a* basically shows that if the position of the throttle levers 48 is L, the vehicle is light, a low starting gear is selected and the tractive resistance is low, giving the set-point value MX for the transmitted torque. According to the table stored in the control unit 45, it can be seen, as is shown in FIG. 3*b*, that the corresponding clutch position assumed is X. The control unit adjusts the clutch position to the set-point value X with the aid of the position sensor 17. When the clutch 3 has assumed the position according to the set-point value, the control system 45 registers this by means of the position sensor 17 and registers the transmitted torque by means of the torque sensor 16. The torque value MX previously assumed for the clutch position X is replaced by a new measured transmitted torque. The control unit 45 continuously updates the torque values in the table during a starting sequence. When the accelerator pedal 48 next assumes the position L and a transmitted torque MX is consequently required, the clutch position may have been adjusted so that the torque actually transmitted corresponds better to what is required. Thus, a gradual adjustment of the torque characteristic of the clutch 3 is obtained, which in addition to vehicle weight, tractive resistance, transmission ratio and accelerator pedal position also takes into account changes in the coefficient of friction of the disks 6, and any other factors that are difficult to predict and which vary slowly over time. Consequently, more rapid changes such as changes in disk thickness due to temperature fluctuations may be more difficult to capture with this embodiment.

In a further preferred embodiment of the invention, the torque sensor 16 is used for direct and hence rapid adjustment of the torque transmitted to the input shaft 7 of the gearbox 9. Stored in the transmission system 45 is a correlation between transmitted torque and corresponding accelerator pedal position according to FIG. 3a. Following previous examples, the throttle lever position L is selected in the case of a light vehicle with a low starting gear and a low tractive resistance. As shown in FIG. 3a, this gives the set-point value MX for the transmitted torque. With the aid of the torque sensor 16, the control system 45 adjusts the clutch position so that the transmitted torque MX required by the accelerator pedal 48 is obtained. During a starting sequence, the control system 45 continuously adjusts the clutch position in order to obtain the transmitted torque required by the accelerator pedal 48. Consequently, a rapid adjustment of the clutch position is obtained in order to achieve the required transmitted torque as a function of vehicle weight, tractive resistance, transmission ratio and accelerator pedal position, irrespective of changes in the coefficient of friction of the disks, changes in disk thickness due to temperature fluctuations and any other factors which are difficult to predict and which vary rapidly or slowly over time.

The invention is not limited to the lowest forward gear of the vehicle but can also be applied to in other gear(s) in the gearbox, including the reverse gears.

In addition, the functions of the control unit 45 may be performed by two or more control units.

While some preferred embodiments of the invention have been described herein, a variety of modifications and alterations can be made by those in the art based on this disclosure. The scope of the disclosure is not limited by the descriptions of the illustrative embodiments. The present invention encompasses numerous other embodiments and examples within the scope of the claims.

What is claimed is:

1. A method for controlling the position of an automatic disk clutch (3) as a function of the position of a throttle lever (48, 49) arranged in the vehicle, the method being employed when starting the vehicle from stationary or virtually from stationary, in which method a function of the disk clutch (3) includes to transmit motive force from an internal combustion engine (1) arranged in a vehicle to an input shaft (7) of a stage-geared gearbox (9) arranged in the vehicle, wherein before every new vehicle start, the disk clutch (3) automatically takes a position (P21, P22, L), wherein the method comprises taking said position as a function of at least one of the parameters vehicle weight, tractive resistance of the vehicle, or selected transmission ratio between the gearbox input shaft (7) and the driving wheels of the vehicle so as to take a disk clutch position close to current traction position, said method further including determining a required torque transmitted to the gearbox input shaft (7) as a function of the position of the throttle lever (48) and at least one of the said parameters and controlling the position of the disk clutch (3) according to a measurement of the torque actually transmitted to the gearbox input shaft (7) in order to achieve a required transmitted torque.

2. The method as claimed in claim 1, further including determining a set-point value for the position of the disk clutch (3) as a function of the position of the throttle lever (48) and at least one of the said parameters and setting the disk clutch (3) to the position that corresponds to the set-point value.

3. The method as claimed in claim 1, further including representing the required transmitted torque by a stored disk clutch position and adjusting the disk clutch (3) to the stored position, and when the stored position is attained measuring and storing the transmitted torque together with the relevant clutch position attained, so that each clutch position matching a transmitted torque is subsequently modified or adjusted.

4. The method as claimed in claim 1, further including continuously measuring the transmitted torque and using the measured torque for direct adjustment of the position of the disk clutch (3) until the measured torque attains the same value as the required transmitted torque.

5. The method as claimed in claim 1, further including performing the method of control after the starting gear has been selected in the vehicle starting sequence from stationary or virtually from stationary.

6. The method as claimed in claim 3, further including performing the method of control after the starting gear has been selected in the vehicle starting sequence from stationary or virtually from stationary.

7. The method as claimed in claim 4, further including performing the method of control after the starting gear has been selected in the vehicle starting sequence from stationary or virtually from stationary.

8. A device for controlling the position of a disk clutch (3), a function of which disk clutch (3) is to transmit motive force from an internal combustion engine (1) arranged in a vehicle to an input shaft (7) of a stage-geared gearbox (9) arranged in the vehicle, the device comprising:
a throttle lever position sensor (49) for a throttle lever (48) arranged in the vehicle, means for determining the tractive resistance of the vehicle, means for determining the vehicle weight, and means for determining the selected transmission ratio between the input shaft (7) of the gearbox (9) and the driving wheels of the vehicle, all of which means and position sensors are coupled to a control unit (45) and in which the control unit is designed to control the position of the disk clutch (3) as a function of a signal from the throttle lever position sensor (49),
wherein said control unit (45) is configured to, before every vehicle start from stationary or virtually from stationary, control the position of the disk clutch (3) as a function of a signal from at least one of the said means, so as to take a disk clutch position (RF1, RF2, L) close to current traction position, said device further including a torque sensor (16) arranged on the input shaft (7) of the gearbox (9) and said control unit (45) being configured to continuously compare a torque measured by a torque sensor (t6) with a torque required from the throttle lever (48) to the input shaft (7) of the gearbox (9) and to adjust the position of the disk clutch (3) so that the measured torque becomes the required torque.

9. A device for controlling the position of a disk clutch (3), a function of which disk clutch (3) is to transmit motive force from an internal combustion engine (1) arranged in a vehicle to an input shaft (7) of a stage-geared gearbox (9) arranged in the vehicle, the device comprising:

a throttle lever position sensor (49) for a throttle lever (48) arranged in the vehicle, means for determining the tractive resistance of the vehicle, means for determining the vehicle weight, and means for determining the selected transmission ratio between the input shaft (7) of the gearbox (9) and the driving wheels of the vehicle, all of which means and position sensors are coupled to a control unit (45) and in which the control unit is designed to control the position of the disk clutch (3) as a function of a signal from the throttle lever position sensor (49), wherein said control unit (45) is configured to, before every vehicle start from stationary or virtually from stationary, control the position of the disk clutch (3) as a function of a signal from at least one of the said means, so as to take a disk clutch position (RF1, RF2, L) close to current traction position, and wherein said control unit (45) is configured to store a table containing the transmitted torque and the matching position of the disk clutch and said control unit (45) is further configured to subsequently update each torque matching a disk clutch position by measuring the transmitted torque in the relevant disk clutch position by a torque sensor (16) which is arranged on the gearbox input shaft (7).

10. A device for controlling the position of a disk clutch (3) that transmits motive force from an internal combustion engine (1) arranged in a vehicle to an input shaft (7) of a stage-geared gearbox (9) arranged in the vehicle, comprising:

a throttle lever position sensor (49) for a throttle lever (48) arranged in the vehicle, and at least one of i) a tractive resistance determination unit, ii) a vehicle weight determination unit, and iii) a selected transmission ratio determination unit determining the ratio between the input shaft (7) of the gearbox (9) and the driving wheels of the vehicle;

wherein said at least one determination unit and said position sensor are coupled to a control unit (45) configured to control the position of the disk clutch (3) as a function of a signal from the throttle lever position sensor (49); and wherein said control unit (45) is configured to, before every vehicle start from stationary or virtually from stationary, control the position of the disk clutch (3) as a function of a signal from at least one of the said at least one determination units, so as to take a disk clutch position (RF1, RF2, L) close to current traction position;

said device further including a torque sensor (16) arranged on the input shaft (7) of the gearbox (9) and said control unit (45) being configured to continuously compare a torque measured by a torque sensor (t6) with a torque required from the throttle lever (48) to the input shaft (7) of the gearbox (9) and to adjust the position of the disk clutch (3) so that the measured torque becomes the required torque.

11. The device for controlling a disk clutch as claimed in claim 10, wherein said device includes each of said tractive resistance determination unit, said vehicle weight determination unit, and said selected transmission ratio determination unit.

12. A device for controlling the position of a disk clutch (3) that transmits motive force from an internal combustion engine (1) arranged in a vehicle to an input shaft (7) of a stage-geared gearbox (9) arranged in the vehicle, comprising:

a throttle lever position sensor (49) for a throttle lever (48) arranged in the vehicle, and at least one of i) a tractive resistance determination unit, ii) a vehicle weight determination unit, and iii) a selected transmission ratio determination unit determining the ratio between the input shaft (7) of the gearbox (9) and the driving wheels of the vehicle;

wherein said at least one determination unit and said position sensor are coupled to a control unit (45) configured to control the position of the disk clutch (3) as a function of a signal from the throttle lever position sensor (49);

wherein said control unit (45) is configured to, before every vehicle start from stationary or virtually from stationary, control the position of the disk clutch (3) as a function of a signal from at least one of the said at least one determination units, so as to take a disk clutch position (RF1, RF2, L) close to current traction position; and wherein said control unit (45) is configured to store a table containing the transmitted torque and the matching position of the disk clutch and said control unit (45) is further configured to subsequently update each torque matching a disk clutch position by measuring the transmitted torque in the relevant disk clutch position by a torque sensor (16), which is arranged on the gearbox input shaft (7).

13. The device for controlling a disk clutch as claimed in claim 12, wherein said device includes each of said tractive resistance determination unit, said vehicle weight determination unit, and said selected transmission ratio determination unit.

* * * * *